US008850359B2

(12) United States Patent
Kubo et al.

(10) Patent No.: US 8,850,359 B2
(45) Date of Patent: Sep. 30, 2014

(54) IMAGE PROCESSOR AND IMAGE PROCESSING METHOD

(75) Inventors: Satoshi Kubo, Ishikawa (JP); Satoshi Ishida, Ishikawa (JP); Yasunori Taniguchi, Ishikawa (JP)

(73) Assignee: PFU Limited, Ishikawa (JP)

( * ) Notice: Subject to any disclaimer, the term of this patent is extended or adjusted under 35 U.S.C. 154(b) by 218 days.

(21) Appl. No.: 12/251,033

(22) Filed: Oct. 14, 2008

(65) Prior Publication Data

US 2009/0210825 A1      Aug. 20, 2009

(30) Foreign Application Priority Data

Feb. 20, 2008  (JP) ................................. 2008-038743

(51) Int. Cl.
*G06F 3/0482* (2013.01)
*G06F 17/30* (2006.01)
*G06T 7/40* (2006.01)
*G06F 3/0481* (2013.01)

(52) U.S. Cl.
CPC ........ *G06F 17/30253* (2013.01); *G06F 3/0482* (2013.01); *G06F 3/04817* (2013.01); *G06F 17/30274* (2013.01); *G06T 7/408* (2013.01)
USPC ........................................................ 715/838

(58) Field of Classification Search
USPC .................................. 715/835, 836, 837, 838
See application file for complete search history.

(56) References Cited

U.S. PATENT DOCUMENTS

| | | | |
|---|---|---|---|
| 7,055,104 B1 * | 5/2006 | Billmaier et al. ............. | 715/765 |
| 7,356,774 B2 * | 4/2008 | Shah et al. .................... | 715/771 |
| 7,616,235 B2 * | 11/2009 | Shibuya et al. ............ | 348/231.2 |
| 2003/0030678 A1 * | 2/2003 | Rosenholtz et al. .......... | 345/838 |
| 2005/0251758 A1 * | 11/2005 | Cummins et al. ............. | 715/838 |
| 2006/0064716 A1 * | 3/2006 | Sull et al. ......................... | 725/37 |
| 2006/0085743 A1 * | 4/2006 | Baudisch et al. ............. | 715/526 |
| 2007/0067738 A1 * | 3/2007 | Flynt et al. .................... | 715/810 |
| 2007/0094611 A1 * | 4/2007 | Sasaki ........................... | 715/804 |
| 2008/0141166 A1 * | 6/2008 | Goldberg et al. ............. | 715/788 |
| 2008/0307363 A1 * | 12/2008 | Jalon et al. .................... | 715/835 |

FOREIGN PATENT DOCUMENTS

| | | |
|---|---|---|
| JP | H-07-015706 A | 1/1995 |
| JP | H09-331499 A | 12/1997 |
| JP | 2002132999 | 5/2002 |
| JP | 2002-344721 A | 11/2002 |
| JP | 2003-125190 A | 4/2003 |

(Continued)

OTHER PUBLICATIONS

Japanese Office Action for Application No. JP2008-038743 mailed Jan. 24, 2012.

(Continued)

*Primary Examiner* — Tuyetlien Tran
(74) *Attorney, Agent, or Firm* — Lowe Hauptman & Ham, LLP

(57) ABSTRACT

An image processing method executed by an image processor comprising a displaying unit, a storage unit, and a control unit, wherein the storage unit includes an image data storage unit that stores image data displayed in thumbnail form and a keyword associated with the image data, and the method includes a keyword obtaining step of obtaining the keyword corresponding to the image data stored in the image data storage unit; and a thumbnail image with keyword displaying step of displaying the keyword obtained at the keyword obtaining step on the displaying unit, with the keyword being overlapped with the image data.

10 Claims, 3 Drawing Sheets

(56) References Cited

FOREIGN PATENT DOCUMENTS

| | | | |
|---|---|---|---|
| JP | 2003-132074 | A | 5/2003 |
| JP | 2003259268 | | 9/2003 |
| JP | 2003-333397 | A | 11/2003 |
| JP | 2004-164372 | A | 6/2004 |
| JP | 2005-151127 | A | 6/2005 |
| JP | 2007082088 | | 3/2007 |
| JP | 2007-236726 | A | 9/2007 |
| JP | 2007236726 | | 9/2007 |

OTHER PUBLICATIONS

Japanese Office Action dated Nov. 15, 2011, issued in corresponding Japanese Patent Application No. 2008-038743.

Japanese Office Action for Application No. 2008-038743 mailed Apr. 10, 2012.

A JP Office Action, mailed Jun. 26, 2012 in JP Application No. 2008-038743.

* cited by examiner

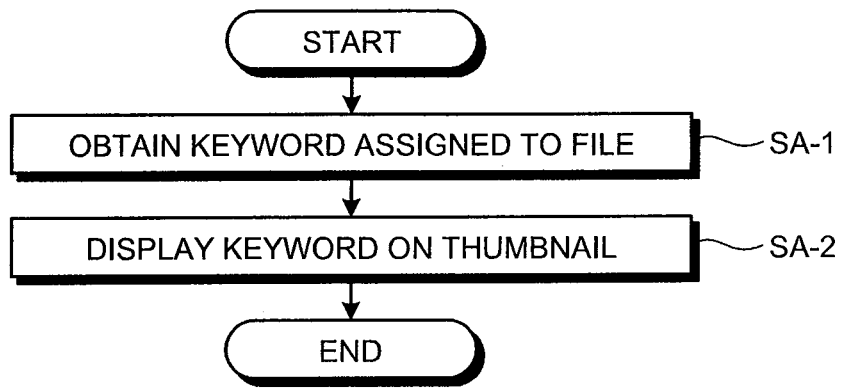
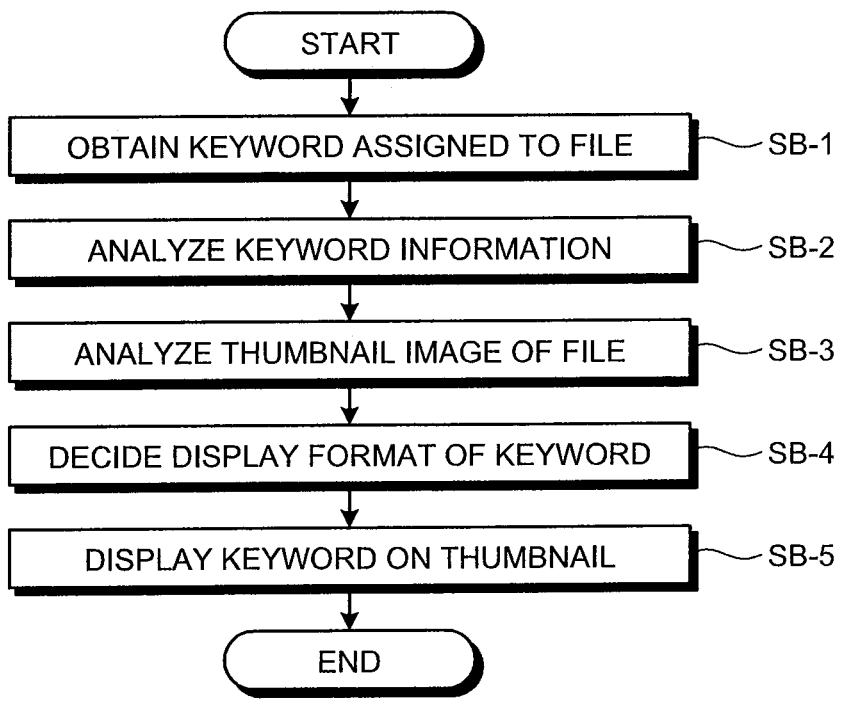

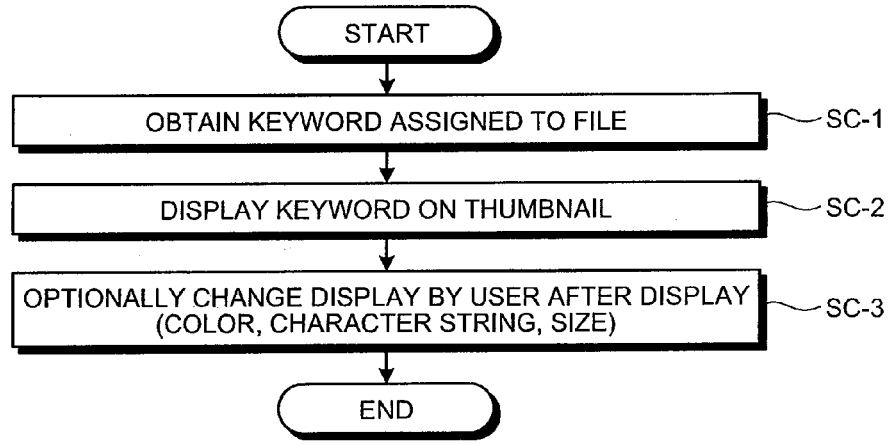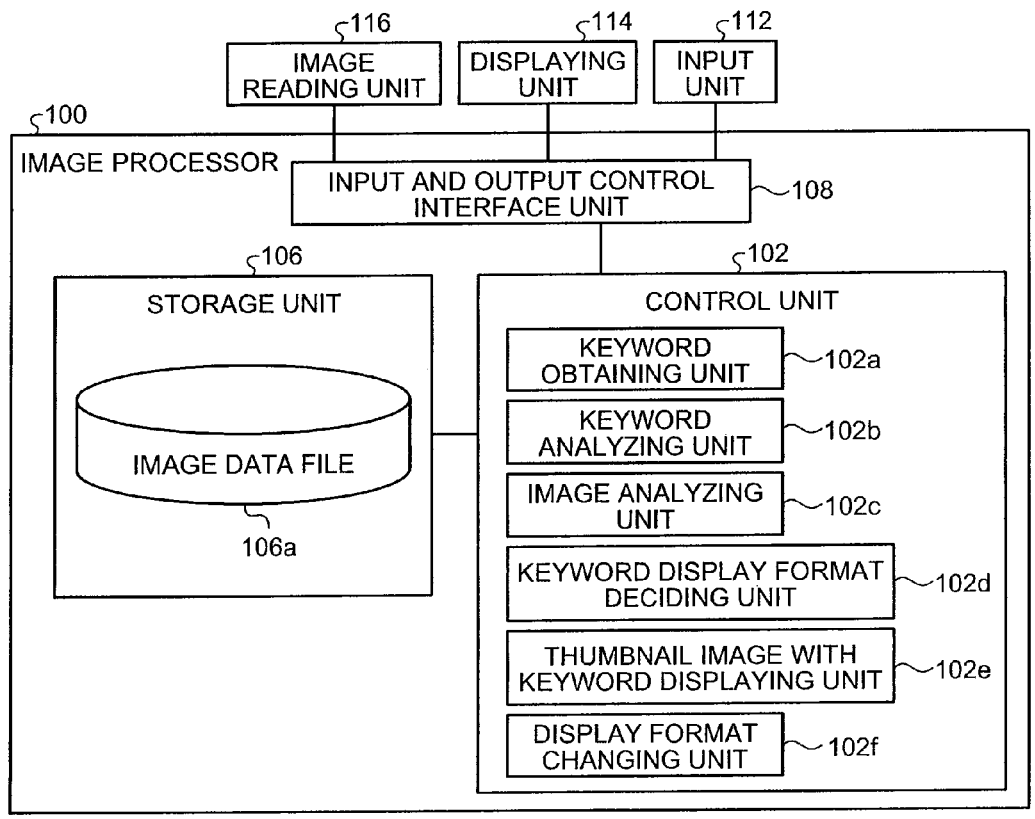

IMAGE PROCESSOR AND IMAGE PROCESSING METHOD

RELATED APPLICATIONS

The present application is based on, and claims priority from, Japan Application Number 2008-038743, filed Feb. 20, 2008, the disclosure of which is hereby incorporated by reference herein in its entirety.

BACKGROUND OF THE INVENTION

1. Field of the Invention

The present invention relates to an image processor and an image processing method.

2. Description of the Related Art

Recently, due to improvement in performance of a personal computer, information (number of files) in the personal computer has become enormous, and improvement of search performance is a very important issue. Also, opportunities to manage large amount of image data such as images read by a scanner and photographs taken with a digital camera has been increasing. When searching such image data, a search using a thumbnail display is used.

For example, in the technology disclosed in JP-A-2005-151127, a file is searched in the following way.
(1) A desired file is found by viewing a thumbnail and a file name.
(2) The search is performed for the file name to extract the desired file.
(3) A keyword is assigned to the file itself and the desired file is extracted by the file search.
(4) The search is performed for contents (word, sentence) of the file when the file is an OCR converted image file.

However, in the conventional technology (for example, JP-A-2005-151127), an A4 sized-file or the like obtained by the scanner or the like has a low level of visibility when displayed in thumbnail form, so that search efficiency is not high at all. For example, when the file is the image data such as the photograph, the file may be confirmed by viewing the display in thumbnail form; however, when this is document data and spreadsheet data such as a document and a ledger sheet, there is a problem that document data and spreadsheet data are too small to be recognized on the view when displayed in thumbnail form.

SUMMARY OF THE INVENTION

It is an object of the present invention to at least partially solve the problems in the conventional technology.

An image processing method according to one aspect of the present invention is executed by an image processor including a displaying unit, a storage unit, and a control unit, wherein the storage unit includes an image data storage unit that stores image data displayed in thumbnail form and a keyword associated with the image data. The method includes a keyword obtaining step of obtaining the keyword corresponding to the image data stored in the image data storage unit and a thumbnail image with keyword displaying step of displaying the keyword obtained at the keyword obtaining step on the displaying unit, with the keyword being overlapped with the image data.

An image processor according to another aspect of the present invention includes a displaying unit, a storage unit, and a control unit, wherein the storage unit includes an image data storage unit that stores image data displayed in thumbnail form and a keyword associated with the image data. The control unit includes a keyword obtaining unit that obtains the keyword corresponding to the image data stored in the image data storage unit and a thumbnail image with keyword displaying unit that displays the keyword obtained by the keyword obtaining unit on the displaying unit, with the keyword being overlapped with the image data.

In this manner, the present invention is characterized in improving the search efficiency by viewing two kinds of information, which are the thumbnail and the keyword, by displaying the keyword so as to be overlapped with the image data displayed in thumbnail form.

The above and other objects, features, advantages and technical and industrial significance of this invention will be better understood by reading the following detailed description of presently exemplary embodiments of the invention, when considered in connection with the accompanying drawings.

BRIEF DESCRIPTION OF THE DRAWINGS

FIG. 1 is a flowchart showing a basic process of the present invention;

FIG. 2 is a flowchart showing the basic process of the present invention;

FIG. 3 is a flowchart showing the basic process of the present invention;

FIG. 4 is a block diagram showing one example of a configuration of an image processor 100 to which the present invention is applied.

DETAILED DESCRIPTION OF THE PREFERRED EMBODIMENTS

Figure 5:
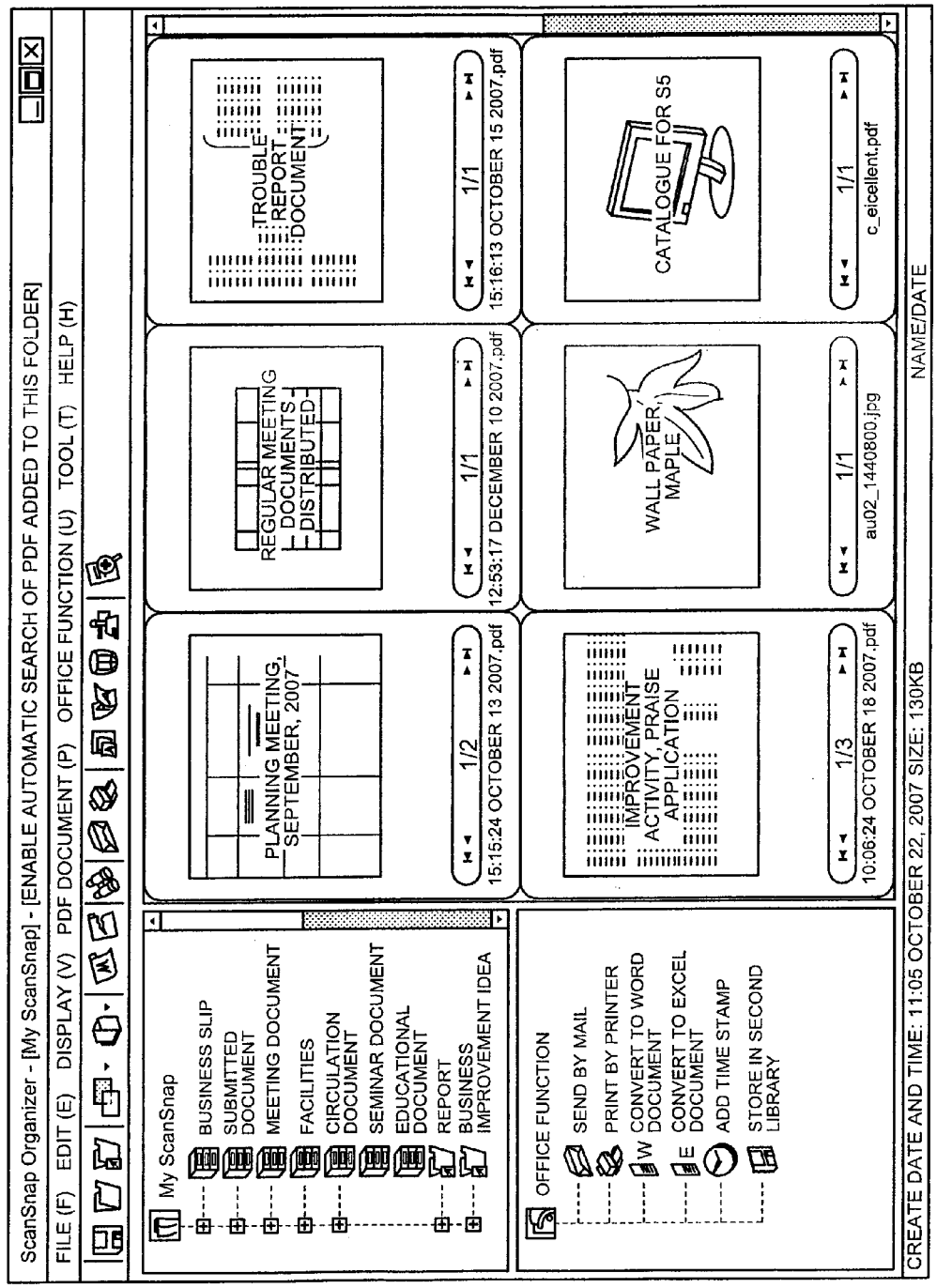
FIG. 5 is a view showing a display example of a thumbnail image with keyword in an embodiment of the present invention.

Exemplary embodiments of the image processor and the image processing method according to the present invention are described below in detail with reference to the accompanying drawings. The embodiments are not to be thus limited.

Overview of the Invention

An overview of the present invention is described first, followed by detail description of structure and processes of the present invention.

In general, the present invention has the following basic characteristic. That is, the present invention is an image processor provided with a displaying unit, a storage unit, and a control unit, and the storage unit stores image data displayed in thumbnail form and a keyword associated with the image data. The image data displayed in thumbnail form includes, for example, capture image data of a display screen displaying a document file, a spreadsheet file, a text file and the like, and image data such as a photograph.

The image processor may further be provided with an image reading unit, and the image data may be the image data read from a document by the image reading unit.

First, a basic process of the present invention is explained with reference to FIG. 1.

As shown in FIG. 1, the present invention obtains the keyword corresponding to the image data stored in the storage unit (step SA-1).

Then, the present invention displays an obtained keyword in thumbnail form on the displaying unit, with the keyword being overlapped with the image data (step SA-2).

The present invention may decide a display format of the keyword by analyzing the keyword and the image data, or may perform the process as in steps SB-1 to SB-6 shown in FIG. 2.

As shown in FIG. 2, the present invention obtains the keyword corresponding to the image data stored in the storage unit (step SB-1).

Then, the present invention obtains keyword information of the keyword by analyzing the obtained keyword (step SB-2).

The "keyword information" may include information regarding the number of the keywords or the number of characters of the keywords.

The present invention obtains color information of the image data by analyzing the image data (step SB-3).

The present invention decides the display format of the keyword based on obtained keyword information and color information (step SB-4).

The "display format" may include information regarding at least one of the number of the keywords, a size of the character, a color of the character, and a displaying position.

The present invention displays the keyword in thumbnail form on the displaying unit, with the keyword overlapped with the image data, based on a decided display format (step SB-5).

The present invention may change the display format of the keyword based on a change instruction of a user after displaying the thumbnail, or may perform the process as in steps SC-1 to SC-3 shown in FIG. 3. The present invention may further be provided with an input unit.

As shown in FIG. 3, the present invention obtains the keyword corresponding to the image data stored in the storage unit (step SC-1).

The present invention displays the obtained keyword in thumbnail form on the displaying unit, with the keyword being overlapped with the image data (step SC-2).

The present invention changes the display format of the displayed keyword based on the change instruction of the user input through the input unit (step SC-3).

In this manner, the present invention may overlap-display the keyword assigned to the file, which is the image data when displaying in thumbnail form. On this occasion, visibility of the thumbnail may be increased by displaying the keyword by using watermark technique (for example, by making a layer of the keyword transparent or semi-transparent). The present invention does not attach the image of the keyword on the image data itself, so that it is not necessary to display the keyword when selecting to display only the image data.

Configuration of the Image Processor 100

A configuration of the image processor 100 will be explained below. FIG. 4 conceptually shows only parts related to the present invention.

In FIG. 4, in general, an image processor 100 is provided with a control unit 102 such as CPU or the like that integrally controls an entire image processor 100, a communication control interface unit (not shown) that connects to a communication device (not shown) such as a router connected to a communication channel or the like, an input/output control interface unit 108 connected to an input unit 112, an displaying unit 114 and an image reading unit 116, and a storage unit 106 that stores various databases and tables, and the units are communicatably connected through an optional communication channel.

The various databases and tables (an image data file t 106*a*) stored in the storage unit 106 are the storage units such as a fixed disk drive and store various programs used in various processing, tables, files, databases, webpages or the like.

Out of components of the storage unit 106, the image data file 106*a* stores the image data displayed in thumbnail form and the keyword associated with the image data. The image data may be the image data read from the document by the image reading unit 116.

In FIG. 4, the input/output control interface unit 108 controls the input unit 112, the displaying unit 114, and the image reading unit 116. The image reading unit 116 is the scanner, for example, and is capable of reading the image data from a document. A monitor (including a home television) may be used as the displaying unit 114 (hereinafter, the displaying unit 114 is sometimes referred to as the monitor). A keyboard, a mouse, a microphone and the like may be used as the input unit 112.

In FIG. 4, the control unit 102 includes an internal memory for storing a control program such as an Operating System (OS), a program that defines various procedures or the like, and required data, and performs information processing for executing various processes using such programs. The control unit 102 is functionally and conceptually provided with a keyword obtaining unit 102*a*, a keyword analyzing unit 102*b*, an image analyzing unit 102*c*, a keyword display format deciding unit 102*d*, a thumbnail image with keyword displaying unit 102*e*, and a display format changing unit 102*f*.

The keyword obtaining unit 102*a* obtains the keyword corresponding to the image data stored in the image data file 106*a*.

The keyword analyzing unit 102*b* obtains the keyword information of the keyword by analyzing the keyword obtained by the keyword obtaining unit 102*a*. The "keyword information" may include the information regarding the number of the keywords or the number of characters of the keywords.

The image analyzing unit 102*c* obtains the color information of the image data by analyzing the image data.

The keyword display format deciding unit 102*d* decides the display format of the keyword based on the keyword information obtained by the keyword analyzing unit 102*b* and the color information obtained by the image analyzing unit 102*c*. The "display format" may include information regarding one of the number of the keywords, the size of the character, the color of the character, and the displaying position.

The thumbnail image with keyword displaying unit 102*e* displays the keyword obtained by the keyword obtaining unit 102*a* in thumbnail form on the displaying unit 114, with the keyword being overlapped with the image data. The thumbnail image with keyword displaying unit 102*e* may display the keyword and the image data on the displaying unit 114 in thumbnail form, with the keyword overlapped with the image data, based on the display format decided by the keyword display format deciding unit 102*d*.

The display format changing unit 102*f* changes the display format of the keyword displayed by the thumbnail image with keyword displaying unit 102*e* based on the change instruction of the user input through the input unit 112. The display format of the keyword is, for example, the color, the character string, and the size of the keyword, and the display format may be optionally changed by the user through the input unit 112.

Referring again to FIG. 4, the image processor 100 may be communicatably connected to a network (not shown) through a communication device such as a router and a wired or wireless communication line such as a dedicated line. A communication control interface unit (not shown) may execute communication control between the image processor and the network (or the communication device such as the router). That is to say, the communication control interface unit (not shown) may include the function to communicate data with another terminal through the communication line. The network includes the function to interconnect the image processor 100 and an external device (not shown), and the network may be an Internet, a telephone network (including a mobile phone network and a fixed-line telephone network, or the like), and an intranet.

Process of the Image Processor 100

The following describes in detail one example of processing of the image processor 100 according to the present embodiment as configured above with reference to FIG. 1 through FIG. 3 and FIG. 5.

First, a basic process of the image processor 100 is explained with reference to FIG. 1 again.

As shown in FIG. 1, the keyword obtaining unit 102*a* obtains the keyword corresponding to the image data stored in the image data file 106*a* (step SA-1). The "keyword" is the word or the sentence that represents the file contents or the like used at the time of search or the like. For example, as shown in FIG. 5, as the keyword, there are abstract of the file contents and time and date information such as "planning meeting" and "September 2007", respectively, and the file name such as "regular meeting documents distributed", in the document file and the spreadsheet file or the like, and there are application and contents of the image such as "wall paper" and "maple" respectively, in the image file or the like such as the photograph. In this manner, as the keyword, there are the name, an extension, a storing position, the application, the color, the size, the type (such as image, photograph, music, moving image), update date, access authority, date and time (such as updated date and time, create date and time), an attribution, an owner, a composer, and a title of the file; however, the keyword is not limited to them.

Then, the thumbnail image with keyword displaying unit 102*e* displays the keyword obtained by the keyword obtaining unit 102*a* in thumbnail form on the displaying unit 114, with the keyword being overlapped with the image data (step SA-2). That is to say, the thumbnail image with keyword displaying unit 102*e* displays a keyword window displaying the keyword so as to be overlapped with a window displaying the image data in a state in which a background of the keyword window is see-through (for example, the layer of the keyword is transparent or semi-transparent), as shown in FIG. 5.

Then, another example of the basic process of the image processor 100 is explained with reference to FIG. 2 again.

As shown in FIG. 2, the keyword obtaining unit 102*a* obtains the keyword corresponding to the image data stored in the image data file 106*a* (step SB-1).

Then, the keyword analyzing unit 102*b* obtains keyword information of the keyword obtained by the keyword obtaining unit 102*a*, by analyzing the obtained keyword (step SB-2). The "keyword information" is, for example, the information regarding the number of the keywords or the number of characters of the keywords or the like, and the keyword information is used to display the keyword with an appropriate number, number of characters, or size of the character, when displaying the keyword so as to be overlapped with the image data. The detail thereof will be explained later.

The image analyzing unit 102*c* obtains color information of the image data by analyzing the image data stored in the image data file 106*a* (step SB-3). The "color information" is used to judge the color of the keyword, which may be clearly distinguished from the image data, being the background, when displaying the keyword so as to be overlapped with the image data. The detail thereof will be explained later.

The keyword display format deciding unit 102*d* decides the display format of the keyword based on keyword obtained by the keyword analyzing unit 102*b*, and color information obtained by the image analyzing unit 102*c* (step SB-4). The "display format" is the information regarding one of the number of the keywords, the size of the character, the color of the character, and the displaying position, for example, and is used to sufficiently assure the visibility of both of the image data and the keyword when displaying the keyword so as to be overlapped with the image data. For example, the display format may be to display the keyword accurately showing the contents of the image data with priority when the number of keywords is large, or to display the size of the character larger when the number of keywords is small, or to display with the color of the character different from the color of the image data (background color), or to display at an appropriate position on which the keyword is not overlapped with the background.

The thumbnail image with keyword displaying unit 102*e* displays the keyword in thumbnail form on the displaying unit 114, with the keyword overlapped with the image data, based on the display format decided by the keyword display format deciding unit 102*d* (step SB-5).

Then, further another example of the basic process of the image processor 100 is explained with reference to FIG. 3 again.

As shown in FIG. 3, the keyword obtaining unit 102*a* obtains the keyword corresponding to the image data stored in the image data file 106*a* (step SC-1).

The thumbnail image with keyword displaying unit 102*e* displays the keyword obtained by the keyword obtaining unit 102*a* in thumbnail form on the displaying unit 114, with the keyword being overlapped with the image data (step SC-2).

The display format changing unit 102*f* changes the display format of the displayed keyword based on the change instruction of the user input through the input unit 112 (step SC-3). The display format of the keyword is, for example, the color, the character string, and the size of the keyword, and may be optionally changed by the user through the input unit 112.

Other Embodiments

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

For example, in the embodiment, the image processor 100 performs various processes as a stand-alone device. However, the image processor 100 can be configured to perform processes in response to request from a client terminal, which is a separate unit, and return the process results to the client terminal.

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the image processor 100 are merely conceptual and may not necessarily physically resemble the structures shown in the drawings. For instance, the apparatus need not necessarily have the structure that is illustrated.

For example, the process functions performed by each device of the image processor 100, especially the each process function performed by the control unit 102, can be entirely or partially realized by a central processing unit (CPU) and a computer program executed by the CPU or by a hardware using wired logic. The computer program, recorded on a recording medium to be described later, can be mechanically read by the image processor 100 as the situation demands. In other words, the storage unit 106 such as read-only memory (ROM) or hard disk (HD) stores the computer program that can work in coordination with the operating system (OS) to issue commands to the CPU and cause the CPU to perform various processes. The computer program is first loaded to the random access memory (RAM), and forms a control unit in collaboration with the CPU.

Alternatively, the computer program can be stored in any application program server connected to the image processor 100 via the network, and can be fully or partially loaded as the situation demands.

The computer-readable recording medium on which the computer program can be stored may be a portable type such as flexible disk, magneto optic (MO) disk, ROM, erasable programmable ROM (EPROM), electrically erasable programmable ROM (EEPROM), compact disk-read-only memory (CD-ROM), digital versatile disk (DVD), or a communication medium that stores the computer program for a short term such as communication channels or carrier waves that transmit the computer program over networks such as local area network (LAN), wide area network (WAN), and the Internet.

Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

The storage unit 106 is a fixed disk device such as RAM, ROM, and hard disk or flexible disk, optical disk, and stores therein various programs, tables, databases (such as the image data file), and files required for various processes.

The image processor 100 can also be connected to any existing personal computer, workstation, etc. and can be operated by executing software (that includes computer program, data, etc.) that implements the method according to the present invention in the personal computer or workstation.

The distribution and integration of the device are not limited to those illustrated in the figures. The device as a whole or in parts can be functionally or physically distributed or integrated in an arbitrary unit according to various attachments or how the device is to be used.

According to the present invention, there is an effect to increase visibility when searching the file displayed in thumbnail form, thereby improving the search efficiency of the file by the user.

According to the present invention, there is an effect that the search of the thumbnail image with keyword becomes easier by automatically judging an appropriate display format, so that the visibility when searching the file displayed in thumbnail form is increased, thereby improving the search efficiency of the file by the user.

According to the present invention, it is possible to change to the display format of the keyword easily searched by the user, and there is an effect to increase the visibility when searching the file displayed in thumbnail form, thereby improving the search efficiency of the file by the user.

According to the present invention, there is an effect to increase the visibility when searching the file, which is the image data read from the document by the image reading unit such as the scanner, displayed in thumbnail form, thereby improving the search efficiency of the file by the user.

According to the present invention, there is an effect that the image data displayed in thumbnail form can be displayed with appropriate color, size, and position.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing method executed by an image processor comprising an image reading unit, a displaying unit, a storage unit, and a control unit, wherein the storage unit includes an image data storage unit that stores image data set which are read from documents by the image reading unit, and keywords associated with the image data, the method including:
    a keyword obtaining step of obtaining the keyword based on the image data stored in the image data storage unit;
    a keyword analyzing step of obtaining keyword information of the keyword by analyzing the keyword obtained at the keyword obtaining step, wherein the keyword information includes only information regarding the number of the keywords or the number of characters of the keywords;
    an image analyzing step of obtaining color information of the image data by analyzing the image data;
    a keyword display format deciding step of deciding a display format of the keyword based on the keyword information obtained at the keyword analyzing step and the color information obtained at the image analyzing step, wherein the display format includes information regarding the number of key words, the size of the character, the color of the character, and the displaying position, wherein the size of the character is increased when the number of key words decreased; and
    a thumbnail image with keyword displaying step of displaying the image data set in thumbnail form, and the keywords obtained at the keyword obtaining step in thumbnail form on the displaying unit, with the keyword being overlapped with the thumbnail, based on the display format decided at the keyword display format deciding step.

2. The image processing method according to claim 1, the image processor further comprising an input unit, wherein
    the method further includes a display format changing step of changing the display format of the keyword displayed at the thumbnail image with keyword displaying step, based on a change instruction of a user input through the input unit.

3. The image processing method according to claim 1, the image processor further comprising an image reading unit, wherein
    the image data is the image data read from a document by the image reading unit.

4. The image processing method according to claim 1, wherein the number of keywords to be displayed larger is three or fewer.

5. The image processing method according to claim 1, wherein the number of keywords to be displayed larger is one.

6. An image processor comprising:
   a displaying unit;
   a storage unit, wherein the storage unit includes an image data storage unit that stores image data which is displayed in thumbnail form, and a keyword associated with the image data; and
   a control unit, wherein
   the control unit further includes
      a keyword obtaining unit configured to obtain the keyword based on the image data stored in the image data storage unit;
      a keyword analyzing unit configured to obtain keyword information of the keyword by analyzing the keyword obtained by the keyword obtaining unit, wherein the keyword information includes only information regarding the number of keywords or the number of characters of the keywords;
      an image analyzing unit configured to obtain color information of the image data by analyzing the image data;
      a keyword display format deciding unit configured to decide a display format of the keyword based on the keyword information obtained by the keyword analyzing unit and the color information obtained by the image analyzing unit, wherein the display format includes information regarding the number of keywords, the size of the character, the color of the character, and displaying position, wherein the size of the character is increased when the number of key words decreased; and
      a thumbnail image with keyword displaying unit that displays the keyword obtained by the keyword obtaining unit in thumbnail form on the displaying unit, with the keyword being overlapped with the image data, based on the display format decided by the keyword display format deciding unit.

7. The image processor according to claim 6, further comprising an input unit, wherein
   the control unit further includes a display format changing unit that changes the display format of the keyword displayed by the thumbnail image with keyword displaying unit, based on a change instruction of a user input through the input unit.

8. The image processor according to claim 6, further comprising an image reading unit, wherein
   the image data is the image data read from a document by the image reading unit.

9. The image processor according to claim 6, wherein the number of keywords to be displayed larger is three or fewer.

10. The image processor according to claim 6, wherein the number of keywords to be displayed larger is one.

* * * * *